(12) United States Patent  
Pellikka et al.

(10) Patent No.: US 10,341,551 B1  
(45) Date of Patent: Jul. 2, 2019

(54) METHOD, AN APPARATUS AND A COMPUTER PROGRAM PRODUCT FOR FOCUSING

(71) Applicant: Grundium Oy, Tampere (FI)

(72) Inventors: Matti Pellikka, Lempäälä (FI); Markus Vartiainen, Tampere (FI)

(73) Assignee: GRUNDIUM OY, Tampere (FI)

( * ) Notice: Subject to any disclaimer, the term of this patent is extended or adjusted under 35 U.S.C. 154(b) by 0 days.

(21) Appl. No.: 15/984,832

(22) Filed: May 21, 2018

(51) Int. Cl.
*H04N 5/232* (2006.01)
*G02B 21/24* (2006.01)
*G06T 3/20* (2006.01)
*G06T 3/00* (2006.01)
*G02B 7/34* (2006.01)

(52) U.S. Cl.
CPC ........... *H04N 5/23212* (2013.01); *G02B 7/34* (2013.01); *G02B 21/241* (2013.01); *G06T 3/0093* (2013.01); *G06T 3/20* (2013.01)

(58) Field of Classification Search
CPC .......... G02B 21/00–368; G02B 21/241; G02B 7/34; G06T 2207/10056–10061; G06T 3/20; G06T 3/0093; H04N 5/23212

USPC .................... 250/201.3; 396/432; 348/79–80
See application file for complete search history.

(56) References Cited

U.S. PATENT DOCUMENTS

2004/0256538 A1* 12/2004 Olson ................. G02B 21/002
  250/201.3
2015/0264270 A1* 9/2015 Watanabe ............ G02B 21/365
  348/79

* cited by examiner

*Primary Examiner* — Xi Wang
(74) *Attorney, Agent, or Firm* — Ziegler IP Law Group, LLC (57) ABSTRACT

A method for focusing may include receiving a first image stack of a first field of view, the first image stack including images captured with different focus from the first field of view; determining, from the first image stack, a first spatial distribution of focus depths in which different areas in the first field of view are in focus; determining a first local sample thickness and a first sample tilt in the first field of view based on the first spatial distribution of focus depths; and estimating, based on the first local sample thickness and the first sample tilt, a focus setting for capturing a second image stack from a second field of view.

20 Claims, 7 Drawing Sheets

METHOD, AN APPARATUS AND A COMPUTER PROGRAM PRODUCT FOR FOCUSING

TECHNICAL FIELD

Various example embodiments relate to the field of digital imaging.

BACKGROUND

To get a sharp image of an object, the surface of the object needs to lie within the focus range of an imaging system. The distance to the focus range is determined by the optical configuration of an imaging system. The relative movement between the imaging system and the imaged object may cause the object surface to lie outside the focus range, and the optical configuration of the imaging system needs to be adjusted to retain the focus.

When scanning samples with a digital microscope scanner each field of view may need to be focused separately to keep sample surface within the focus range. Focusing takes time and increases the overall scanning time. There is, therefore, a need for a solution that reduces the time needed for focusing.

SUMMARY

Various aspects include an apparatus, a method and a computer program product comprising a computer program stored therein, which are characterized by what is stated in the independent claims. Various embodiments are disclosed in the dependent claims.

According to a first aspect, there is provided a method for focusing, comprising receiving a first image stack of a first field of view, the first image stack comprising images captured with different focus from the first field of view; determining, from the first image stack, a first spatial distribution of focus depths in which different areas in the first field of view are in focus; determining a first local sample thickness and a first sample tilt in the first field of view based on the first spatial distribution of focus depths; and estimating, based on the first local sample thickness and the first sample tilt, a focus setting for capturing a second image stack from a second field of view.

According to an embodiment, the determining the first local sample thickness and the first sample tilt comprises eliminating effects caused by apparatus-specific measures from the spatial distribution of focus depths.

According to an embodiment, the apparatus-specific measures comprise one or more of a pre-defined field curvature and a pre-defined optical axis tilt.

According to an embodiment, the determining the first local sample thickness and the first sample tilt comprises subtracting terms accounting for pre-defined field curvature and/or pre-defined optical axis tilt from a focus depth model; determining coefficients defining the first local sample thickness and the first sample tilt by applying a linear estimation approach to the focus depth model.

According to an embodiment, the focus depth model comprises coordinate functions transforming an image pixel coordinate and a stage control coordinate pair to stage coordinates, and the method further comprises capturing, at a location according to the stage control coordinates, an image of a known target located at a location according to the stage coordinates on a calibration slide; measuring an image pixel location according to image pixel coordinates from the image of the target; forming a pair of equations modeling a transformation from the image pixel coordinate and the stage control coordinate pair to the stage coordinates; repeating the capturing, measuring and forming at least five times, wherein the known target is located at different location each time; determining coefficients of the transformation by applying a linear estimation approach to the pairs of equations.

According to an embodiment, the method further comprises receiving a third image stack of a third field of view, the third image stack comprising images captured with different focus from the third field of view and wherein the first field of view and the third field of view are adjacent fields of view for the second field of view; determining, from the third image stack, a third spatial distribution of focus depths in which different areas in the third field of view are in focus; determining a third local sample thickness and a third sample tilt based on the third spatial distribution of focus depths; estimating, based on the first local sample thickness, the first sample tilt, the third local sample thickness and the third sample tilt, a focus setting for capturing a second image stack from a second field of view.

According to an embodiment, the method further comprises estimating a first focus setting based on the first local sample thickness and the first sample tilt; estimating a third focus setting based on the third local sample thickness and the third sample tilt; averaging the first focus setting and the third focus setting to obtain the focus setting for capturing the second image stack from the second field of view.

According to an embodiment, the method further comprises assigning a weight for the first focus setting based on the distance between the first field of view and the second field of view.

According to an embodiment, the method further comprises assigning a weight for the first focus setting based on a planarity of the first spatial distribution of focus depths.

According to a second aspect, there is provided an apparatus comprising at least one processor; at least one memory including computer program code; the at least one memory and the computer program code configured to, with the at least one processor, cause the apparatus at least to perform receiving a first image stack of a first field of view, the first image stack comprising images captured with different focus from the first field of view; determining, from the first image stack, a first spatial distribution of focus depths in which different areas in the first field of view are in focus; determining a first local sample thickness and a first sample tilt in the first field of view based on the first spatial distribution of focus depths; and estimating, based on the first local sample thickness and the first sample tilt, a focus setting for capturing a second image stack from a second field of view.

According to an embodiment, the focus depth model comprises coordinate functions transforming an image pixel coordinate and a stage control coordinate pair to stage coordinates, and the apparatus is further caused to perform capturing, at a location according to the stage control coordinates, an image of a known target located at a location according to the stage coordinates on a calibration slide; measuring an image pixel location according to image pixel coordinates from the image of the target; forming a pair of equations modeling a transformation from the image pixel coordinate and the stage control coordinate pair to the stage coordinates; repeating the capturing, measuring and forming at least five times, wherein the known target is located at different location each time; determining coefficients of the transformation by applying a linear estimation approach to the pairs of equations.

According to an embodiment, the apparatus is further caused to perform receiving a third image stack of a third field of view, the third image stack comprising images captured with different focus from the third field of view and wherein the first field of view and the third field of view are adjacent fields of view for the second field of view; determining, from the third image stack, a third spatial distribution of focus depths in which different areas in the third field of view are in focus; determining a third local sample thickness and a third sample tilt based on the third spatial distribution of focus depths; estimating, based on the first local sample thickness, the first sample tilt, the third local sample thickness and the third sample tilt, a focus setting for capturing a second image stack from a second field of view.

According to an embodiment, the apparatus is further caused to perform estimating a first focus setting based on the first local sample thickness and the first sample tilt; estimating a third focus setting based on the third local sample thickness and the third sample tilt; averaging the first focus setting and the third focus setting to obtain the focus setting for capturing the second image stack from the second field of view.

According to an embodiment, the apparatus is further caused to perform assigning a weight for the first focus setting based on the distance between the first field of view and the second field of view.

According to an embodiment, the apparatus is further caused to perform assigning a weight for the first focus setting based on a planarity of the first spatial distribution of focus depths.

According to an embodiment, the apparatus is a digital microscope scanner.

According to a third aspect, there is provided computer program product embodied on a non-transitory computer readable medium, comprising computer program code configured to, when executed on at least one processor, cause an apparatus or a system to: receiving a first image stack of a first field of view, the first image stack comprising images captured with different focus from the first field of view; determining, from the first image stack, a first spatial distribution of focus depths in which different areas in the first field of view are in focus; determining a first local sample thickness and a first sample tilt in the first field of view based on the first spatial distribution of focus depths; and estimating, based on the first local sample thickness and the first sample tilt, a focus setting for capturing a second image stack from a second field of view.

DESCRIPTION OF THE DRAWINGS

In the following, various embodiments of the invention will be described in more detail with reference to the appended drawings, in which.

Drawings are schematic.

DESCRIPTION OF EXAMPLE EMBODIMENTS

In the following, several embodiments will be described in the context of digital microscope scanners. It is to be noted, however, that the invention is not limited to microscope scanners. In fact, the different embodiments have applications in any environment where focusing in digital imaging is required.

Microscopes are instruments that may be used to aid humans to see a magnified view of small samples, e.g. cells or wood fibres. When scanning objects, or samples, with digital microscope scanners each field of view needs to be focused carefully. When the object is in focus, each point on the camera sensor is a conjugate point to a point on the object surface. In other words, a focused and sharp image of an object is formed on the camera sensor. However, if the position of the sample is changed, the image formed on the camera sensor is not focused.

Figure 1:
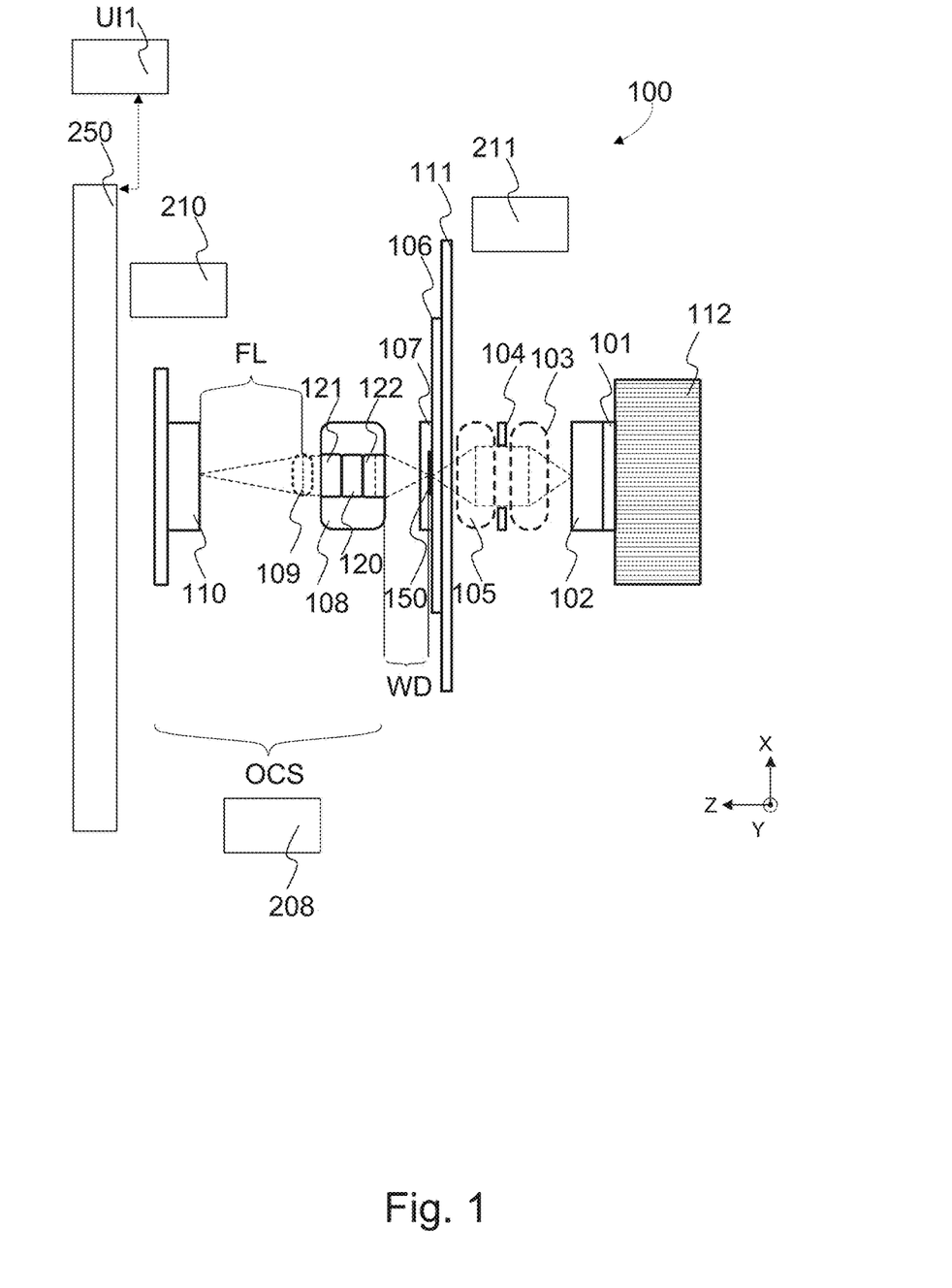
FIG. 1 shows, by way of example, components of an apparatus for scanning microscope slides and for performing focusing.

FIG. 1 shows, by way of example, components of an apparatus for scanning microscope slides and for performing focusing. The scanning apparatus 100 comprises a light source 101. The light source may be e.g. a light emitting diode (LED). The light source may be configured to function as a flash. The LED flash may comprise LEDs of different colours. Acquiring several frames each exposed with LED flash of a different colour enables proper focusing of different colours of the specimen. The flash may be a strobe flash producing short light pulses at high frequency. The flash may be configured to produce a light pulse in synchronization with image capturing.

The scanning apparatus 100 may comprise a radiator 112 for cooling purposes. Thermal energy may at least partly be transferred from the scanning apparatus 100 to surrounding air via body of the scanning apparatus 100. The scanning apparatus 100 comprises a diffuser 102 for forming a uniform light source. The scanning apparatus 100 comprises a collector lens 103 for gathering light from the diffuser 102. The scanning apparatus 100 comprises a diaphragm 104. The diaphragm may comprise an aperture. Size of the aperture may be constant or adjustable. The diaphragm 104 may be e.g. a rotating disk comprising different sized apertures. The diaphragm may comprise a blade structure with movable blades for adjusting the size of the aperture. The size of the aperture regulates the amount of light that passes through into a specimen under investigation. The scanning apparatus 100 comprises a condenser lens 105 for focusing light to a specimen i.e. sample 150.

The specimen 150 is attached on a slide 106. The scanning apparatus 100 comprises a stage 111 for the slide 106. The stage may comprise a hole for passing light through to illuminate the specimen 150. The specimen 150 may be set under a cover glass 107.

The scanning apparatus 100 comprises an objective 108 for collecting light from the specimen 150. The objective may be characterized by its magnification and numerical aperture. The objective comprises a plurality of lenses 120, 121, 122. Distance between the objective 108 and the specimen is a working distance WD.

The objective 108 may be an infinity corrected objective. In infinity corrected objective systems an image distance is set to infinity. In infinity corrected objective systems a tube lens may be used to focus the image. The scanning apparatus 100 may comprise a tube lens 109. The tube lens focuses the light passing through the objective on a camera sensor 110. The tube lens 109 shortens an optical path of the light. By using tube lens to shorten the optical path of the light, the size of the scanning apparatus 100 may be reduced. The tube lens 109 reduces magnification.

The tube lens may be one lens or a system of more than one lens. The tube lens 109 may be a shape-changing lens, i.e. the focus is changed by changing the shape of the lens. An example of a shape-changing lens is a liquid lens. The liquid lens is a lens structure comprising two liquids that don't mix with each other, e.g. oil and water. Curvature of the liquid-liquid interface may be changed by applying electricity to the lens structure. Thus, the focal length of the liquid lens may be adjusted electronically. Another example of a shape-changing lens is based on a combination of optical fluids and a polymer membrane. A container is filled with an optical fluid and sealed off with a thin, elastic polymer membrane. The shape of the lens is changed by pushing a circular ring onto the center of the membrane or by exerting a pressure to the outer part of the membrane or by pumping liquid into or out of the container. The ring may be moved manually or electrically.

The scanning apparatus 100 comprises a camera sensor 110 for capturing images of the specimen. The camera sensor may be a e.g. a charge-coupled device (CCD), a complementary metal-oxide semiconductor (CMOS) or an electron-multiplying CCD (EMCCD).

To get properly focused and sharp images of the specimen, the optical configuration, or focus, of the system may be adjusted. Focus may be adjusted in several ways, e.g. by changing the distance between the objective 108 and the sample, i.e. the working distance WD and/or by changing the focal length of one of the lens element within the objective-tube lens system and/or by changing the distance between the camera sensor 110 and the tube lens 109 along the optical axis, i.e. z-axis.

The focus of the system may be changed e.g. by changing the working distance WD. The working distance WD may be changed e.g. by moving the objective-camera system OSC along the z-axis and/or by moving the specimen stage 111 along the z-axis. The stage 111 is configured to change position. The scanning apparatus 100 comprises a motor 211 for moving the stage 111. The stage 111 is configured to move in different directions, e.g. x, y and z. Z-axis is determined as parallel to the optical axis. X-axis and y-axis are orthogonal to the z-axis. The objective-camera system OCS is configured to change position. The scanning apparatus 100 comprises a motor 208 for moving the objective-camera system OCS. The objective-camera system OCS may be moved along z-axis.

The focus of the system may be changed e.g. by changing the distance between the camera sensor 110 and the tube lens 109. The distance between the camera sensor 110 and the tube lens 109 may be changed e.g. by moving the camera sensor 110 along the z-axis and/or by changing the focal length of the liquid tube lens. The camera sensor 110 may be configured to change position along the z-axis. The scanning apparatus 100 may comprise a motor 210 for moving the camera sensor 110.

The scanning apparatus 100 comprises a control unit 250. The control unit may comprise or may be connected to a user interface UI1. The user interface may receive user input e.g. through a touch screen and/or a keypad. Alternatively, the user interface may receive user input from internet or a personal computer or a smartphone via a communication connection. The communication connection may be e.g. a Bluetooth connection or a WiFi connection. The control unit may comprise e.g. a single board computer. The control unit is configured to control operation of the scanning apparatus. For example, the control unit may be configured to operate the motors 208, 210, 211.

Figure 2:
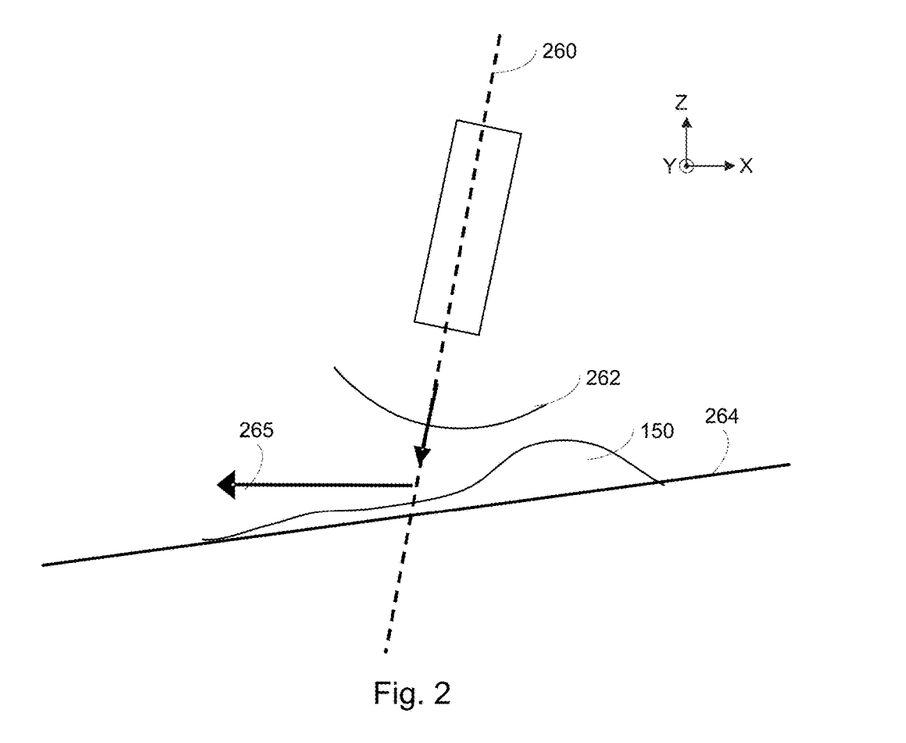
FIG. 2 shows, by way of example, causes of focus depth variation.

In a digital scanning microscope, the best focus may vary within a single field of view, and between different fields of view of the sample specimen. FIG. 2 shows, by way of example, causes of focus variation. An optical configuration parameter, i.e. focus setting, that is controlled to obtain the focus is referred to as a focus depth. The focus depth may refer e.g. to working distance, the focal length of one of the lens elements, and/or the distance between camera sensor and tube lens.

If optical axis 260 is not perpendicular to the stage movement direction 265, focus depth may vary within a single field of view. Field curvature 262 caused by curved nature of optical elements, schematically depicted in the FIG. 2, causes focus depth variation within a single field of view. These two factors, i.e. optical axis tilt and field curvature, are device specific and their effect on the focus depth may be taken into account via calibration measurements as will be described later.

In addition to the reasons already mentioned, the focus depth may be affected by other factors when moving from one field of view to another. A sample plane 264 may be tilted with respect to the stage movement direction 265. The sample plane 264 is a surface of a sample slide on which the sample is placed. In addition, the sample plane 264 and/or the sample 150 itself may have a non-uniform thickness. These factors may cause focus depth variation within one field of view and when moving from one field of view to another.

Different colours of the sample may be focused at different distances (axial/longitudinal chromatic aberration). Focus depth estimation may be performed for each colour separately. Alternatively, focus depth estimation is carried out for one colour and the focus depth is then estimated for the other colours based on a known relationship between focus depth of different colours. The relationship may be estimated beforehand by calibration measurements.

The focus of an individual image or image patch may be determined e.g. by filtering the image with a high-pass filter or a band-pass filter. The more high frequencies are present, the better is the focus.

One way to get properly focused images of each field of view is to capture a stack of images of the field of view with different focus. Then, it is possible to determine a frame with the best focus from the stack of images and form a final image of the whole sample by combining frames in best focus of each field of view. In addition, a number of frames with focus near the best focus may be saved when the sample thickness exceeds the focus range of the imaging system to form multi-layer image of the sample. Information in the different layers of the image may be of interest for e.g. a pathologist.

Alternatively, a best focus depth may be determined from the stack of images. For example, a smaller number of frames is captured with different focus resulting in a sparser frame stack. Sparser here means that the difference in focus depth is larger between consecutive frames than in the previous example, wherein a frame with the best focus from the stack of images is selected for the final image. Then, the best focus depth may be estimated to lie in between two captured frames, and the actual image capture may be performed with the estimated best focus depth. Yet further example is to use the information on best focus depths in creation of a focus map. The focus map may be used to determine the correct focus depth for each field of view for the actual image scanning. However, in all of these examples, the more frames are captured for each stack of images for focusing purposes, the more time is consumed when scanning the sample.

Figure 3:
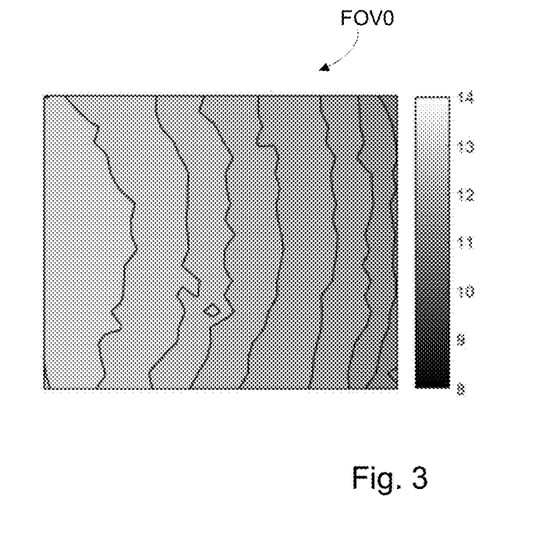
FIG. 3 shows, by way of example, focus depth variation within a single field of view.

The whole field of view is typically not in the best possible focus with the same focus depth. Spatial distribution of the best focus depth may be approximated within the field of view. FIG. 3 shows, by way of example, focus depth variation within a single field of view FOV0.

Different tones in the map depicts different focus depths, i.e. the focus depths with which the best focus is achieved in different areas of the field of view. The best focus may be determined by filtering the image with a high-pass filter or a band-pass filter. The more high frequencies are present, the better is the focus. Thus, it may be determined from the captured stack of images from the field of view with different focus depth setting, in which focus depth the object is in best focus. The variation in focus depth in the field of view FOV0 that is visible in the FIG. 3 is caused by the factors, or at least some of the factors, described earlier in the context of FIG. 2. Curved contours in the focus depth variation are due to the field curvature. Linear trend observed in the variation of the focus depth is due to the optical axis 260 not being perfectly perpendicular to the stage movement direction 265 and/or due to the sample tilt. Effects of the optical axis tilt and the sample tilt on the linear trend in the focus depth variation may be separated from each other by means of calibration measurements and parameter estimation as will be described later.

Figure 4:
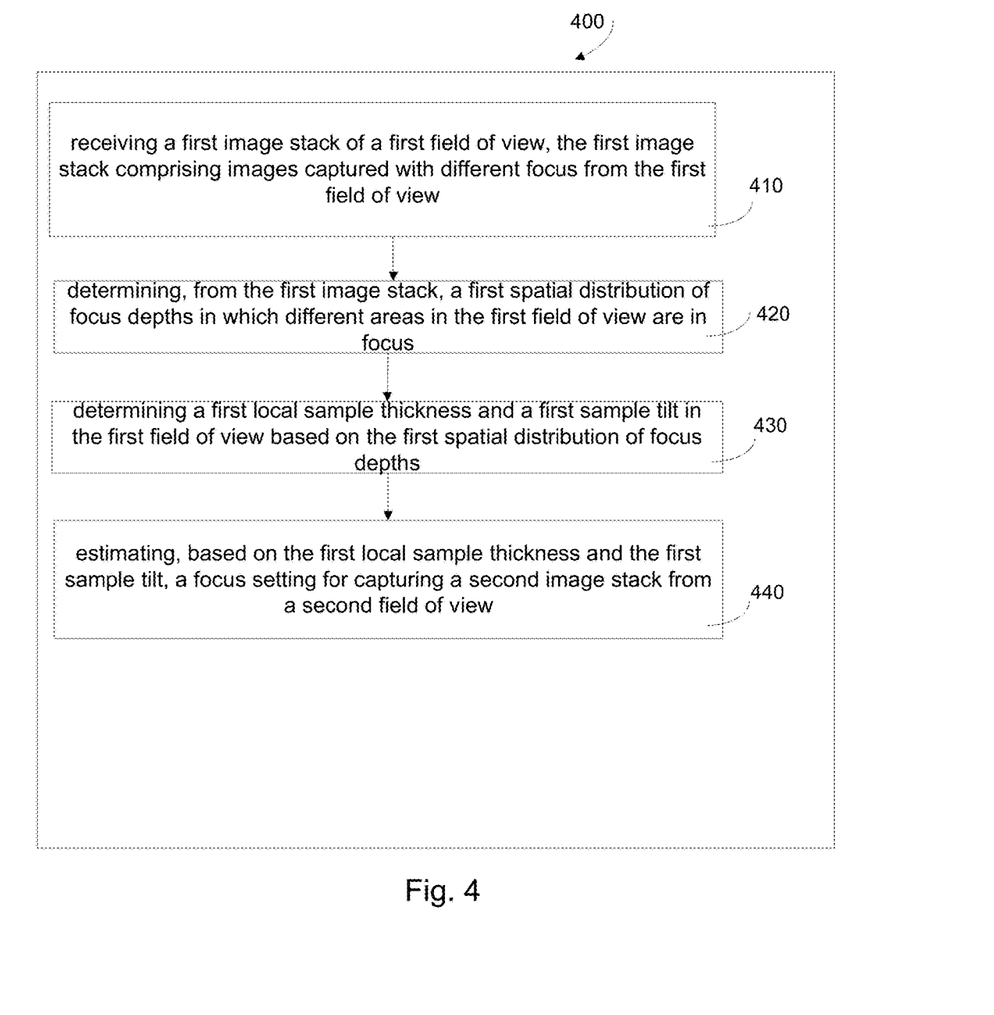
FIG. 4 shows, by way of example, a flowchart of a method for focusing.

FIG. 4 shows, by way of example, a flowchart of a method for focusing. The method 400 comprises receiving 410 a first image stack of a first field of view, the first image stack comprising images captured with different focus from the first field of view. The method 400 comprises determining 420, from the first image stack, a first spatial distribution of focus depths in which different areas in the first field of view are in focus. The method 400 comprises determining 430 a first local sample thickness and a first sample tilt in the first field of view based on the first spatial distribution of focus depths. The method comprises estimating 440, based on the first local sample thickness and the first sample tilt, a focus setting for capturing a second image stack from a second field of view.

The method provides estimation of the best focus depth of a target field of view based on the acquired stack of images of an adjacent field of view. Adjacent may mean neighboring field of view, i.e. field of view surrounding the target field of view. Alternatively, there may be some fields of view or pixels between the target field of view and the adjacent field of view. The method of focusing presented herein reduces the scanning time of the whole sample. Reduction in scanning time is achieved, since the number of frames of an image stack to be acquired from a field of view in order to determine the best focus may be reduced.

The first image stack may be captured by the scanning apparatus, and/or received from the memory of the scanning apparatus. Alternatively, the first image stack may be received from an external memory.

The method may further comprise capturing the second image stack from a second field of view using the estimated focus setting.

Figure 5A:
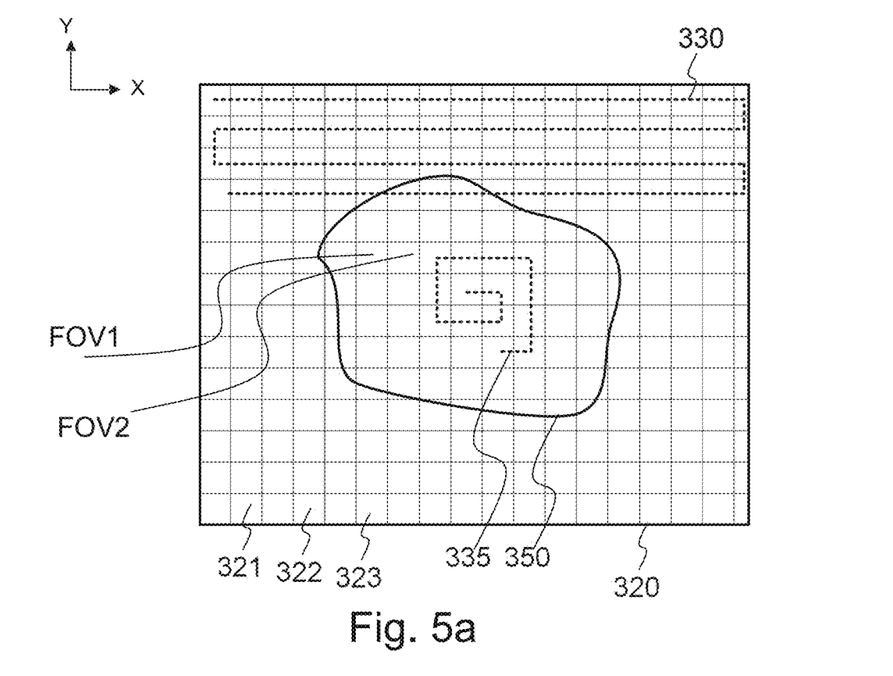
FIG. 5a shows, by way of example, a top view of a sample.

FIG. 5a shows, by way of example, a top view of a sample 350. The sample 350 is on a sample stage. A shape of an area 320 of which an image may be formed may be e.g. rectangular, oval or some other shape. The area to be scanned may be determined by using information acquired with a secondary camera. The area 320 may be chosen to comprise at least a part of the sample 350. The area to be imaged may be divided into fields of view 321, 322, 323. An image of the area 320 comprising at least a part of the sample 350 may be formed by imaging individually the fields of view 321, 322, 323 of the sample. A frame stack, i.e. stack of images with different focus is acquired from individual fields of view. Size of one field of view 321, 322, 323 may depend on which magnification is used. Several fields of view may be acquired from different positions in the sample stage. The fields of view, i.e. sub-images, may be stitched to form a final image covering the whole sample or a selected area of the sample. Stitching process may comprise e.g. image registration, image warping, and blending of the images. In image registration, for each field of view a geometric transformation is determined which maps the field of view to the final image so that its content matches to the content of the neighbouring fields if view in the final image. The geometric transformation may contain a perspective transformation as well as lens distortion correction. The parameters of the transformation may be determined by matching corresponding features between the neighbouring fields of view, and by detecting features in the images of calibration targets. In image warping, the determined geometric transformations are applied to the field of view, producing patches of the final image whose image content come from the field of view, but their location, orientation, and geometric proportions are altered according to the transformations. In image blending, the possible visible intensity discontinuities between the patches in the final image are being faded to produce a seamless final image.

FIG. 5a shows, by way of example, scanning patterns that may be used when capturing the fields of view. A dashed line 330 shows a line-by-line scanning pattern in the sample stage and a dashed line 335 shows a spiral scanning pattern in the sample stage.

The field of view FOV1 is the first field of view. The field of view FOV2 is the second field of view. The second field of view is the target field of view, a focus setting for which is estimated by the method presented herein.

Figure 5B:
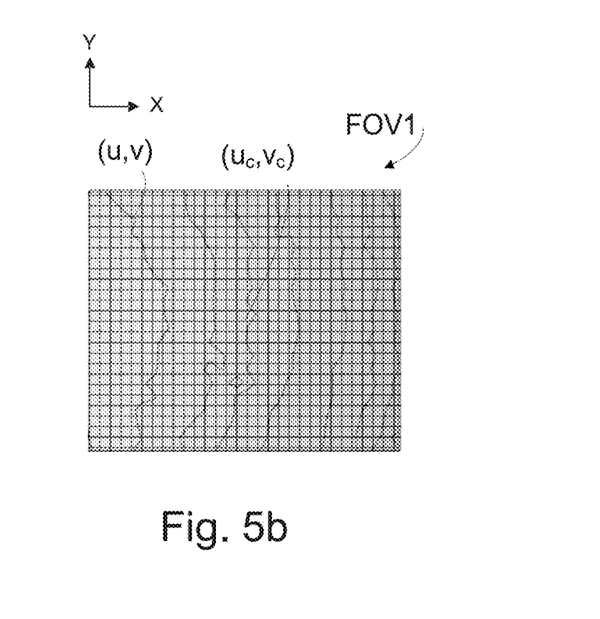
FIG. 5b shows, by way of example, focus depth variation within a single field of view.

FIG. 5b shows, by way of example, focus depth variation within a single field of view FOV1. $(u_c, v_c)$ is the pixel location where the optical axis pierces the image plane, i.e. the distortion center. The distortion center is usually in the substantially central point of the field of view. The distortion center may be calculated beforehand based on calibration measurements, wherein an image of a grid within a calibration slide is captured. In the resulting image, the lines of the grid are distorted. The distortion center is the point with respect to which the lines of the grid appear to be distorted.

Focus depth within a single field of view may be modelled by a focus depth model. The focus depth model may be a following equation (1):

$$z(u,v,m,n)=k((u-u_c)^2+(v-v_c)^2)+a_o(u-u_c)+b_o(v-v_c)+a_s s(u,v,m,n)+b_s t(u,v,m,n)+c, \quad (1)$$

wherein (u, v) are pixel coordinates of the captured image, (m, n) are stage motor control coordinates that determine which part of the sample stage is imaged, z(u, v, m, n) is the measured focus depth at the given pixel and motor position and $(u_c, v_c)$ is the image pixel location where the optical axis pierces the image plane. Coordinates (s, t) are coordinates on the stage surface that can be expressed as functions from given pixel coordinates (u, v) and stage motor control coordinates (m, n). Determination of these coordinate functions may be carried out by measuring the movement of imaged calibration targets with known positions on a sample stage when the stage is moved.

Figure 5C:
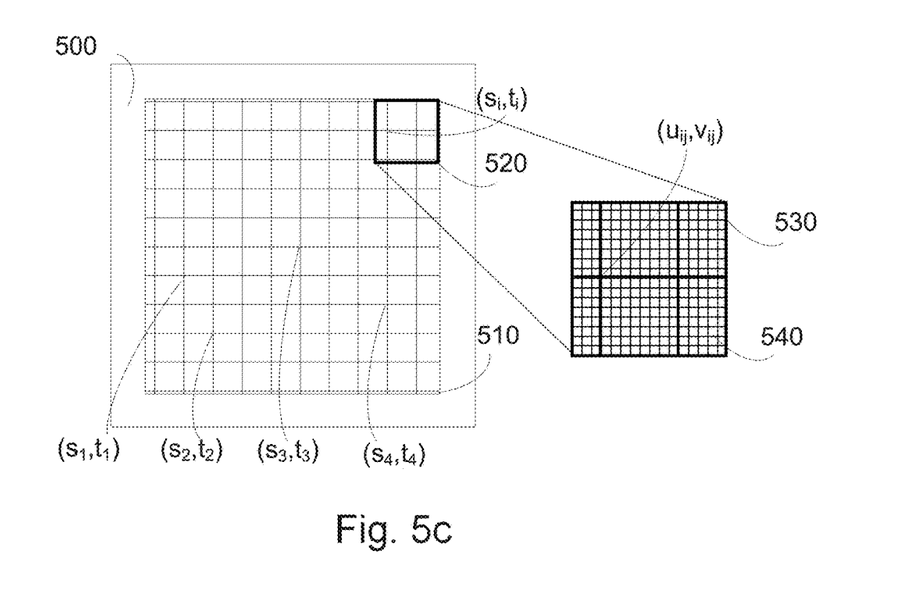
FIG. 5c shows, by way of example, a calibration slide.

FIG. 5c shows, by way of example, a calibration slide. The functions s(u,v,m,n) and t(u,v,m,n) that transform an image pixel coordinate and stage control coordinate pair to stage coordinates are estimated from measuring how fixed positions on stage appear in different locations in captured images when the stage is moved to given control coordinate locations. The transformations are modeled as affine functions $$s(u,v,m,n) = s_u u + s_v v + s_m m + s_n n + s_0,$$

$$t(u,v,m,n) = t_u u + t_v v + t_m m + t_n n + t_0,$$

where the coefficients $s_u, s_v, s_m, s_n, s_0$ and $t_u, t_v, t_m, t_n, t_0$ are estimated from the measurements. Several fixed target locations, i.e. known targets, $(s_1, t_1), (s_2, t_2), \ldots (s_i, t_i)$ with known positions are chosen from a calibration slide 500, for example crossings on a grid slide, where the spacing of the grid 510 is known. The known targets may be located at different positions. Alternatively to the grid slide, the calibration slide may be a slide having other fixed target locations, such as lines, dots or other patterns. Then, several stage motor control coordinates $(m_j, n_j)$ are chosen at which at least one of the stage locations $(s_i, t_i)$ is visible in the captured image 520. An image 530 shows a magnified view of the image 520 and a grid 540 represents the pixels of the image 530. If the location $(s_i, t_i)$ is visible in an image 530 captured at motor coordinates $(m_j, n_j)$, its pixel location $(u_{ij}, v_{ij})$ can be measured from the image. This gives a pair of equations of the form $$s_i = s_u u_{ij} + s_v v_{ij} + s_m m_j + s_n n_j + s_0,$$

$$t_i = t_u u_{ij} + t_v v_{ij} + t_m m_j + t_n n_j + t_0.$$

At least five of such measurements from known targets each located at different location need to be made to be able to estimate the ten coefficients $s_u, s_v, s_m, s_n, s_0$ and $t_u, t_v, t_m, t_n, t_0$ from the resulting linear system of ten equations. With more than five measurements, the effect of pixel location measurement error and motor location error can be reduced for example by applying the least-squares method to the resulting overdetermined system of linear equations. Also, extraneous measurements can be used to filter out erroneous detections of the calibration targets using outlier detection methods.

Referring back to equation (1), the coefficient k is the strength of the field curvature, $a_0$ and $b_o$ are the planar trends caused to the focus depth by the optical axis tilt, and $a_s$ and $b_s$ planar trends caused to the focus depth by the sample tilt. Coefficient c depends on the local sample thickness. Thus, the first term of the equation (1) models the field curvature, second and third terms model the optical axis tilt. Fourth and fifth terms model the sample tilt and the sixth term depends on the local sample thickness.

As described above, effects of the field curvature and the optical axis tilt are device specific and their effect on the focus depth may be taken into account via calibration measurements. A calibration sample having a known uniform thickness is scanned to estimate the device specific field curvature and the optical axis tilt. During calibration, focus depths z(u,v,m,n) of a sample of uniform thickness at multiple stage locations (s, t) with multiple motor configurations (m, n) are measured.

Given this data, i.e. the device specific field curvature and the optical axis tilt, and a priori knowledge of the optical axis center location $(u_c, v_c)$ and the functions s(u, v, m, n) and t(u, v, m, n), each measurement z(u, v, m, n) constitutes an equation (1) with the unknown coefficients k, $a_o$, $b_o$, $a_s$, $b_s$, and c, and multiple such measurements constitutes an overdetermined system of linear equations.

Coefficients of an overdetermined linear systems may be estimated with various methods and with different error minimization criteria. For example, estimation may be performed by minimizing the least squares error, and optionally by taking into account a priori information on the measurement error and/or the expected coefficient values.

The coefficients k, $a_o$, $b_o$ corresponding the field curvature and optical axis tilt are device specific constants which are calculated via calibration measurements. The coefficients $a_s$, $b_s$, and c are sample specific and can vary from stage position to another, i.e. can vary when moving from one field of view to another. They are an unused by-product of the calibration calculations, as they are specific to the used calibration slide.

The apparatus-specific measures may be eliminated from the spatial distribution of focus depths. During imaging of an unknown sample at known motor position (m, n), the focus depths z(u, v, m, n) are measured at multiple pixel locations (u, v), and the effects of field curvature and optical axis tilt are subtracted from the focus depths, and the coefficients $a_s$, $b_s$, and c are determined from the adjusted focus depth data $$z'(u,v,m,n) = z(u,v,m,n) - k((u-u_c)^2 + (v-v_c)^2) - a_o(u-u_c) - b_o(v-v_c). \quad (2)$$

That is, the coefficients $a_s$, $b_s$, and c are estimated from adjusted measurement model $$z'(u,v,m,n) = a_s s(u,v,m,n) + b_s t(u,v,m,n) + c \quad (3)$$

by applying an overdetermined linear system of equations approach.

Once the coefficients $a_s$, $b_s$, and c are estimated, the focus depth at a nearby motor position (m',n') can then be estimated as $$z(u_c, v_c, m', n') = a_s s(u_c, v_c, m', n') + b_s t(u_c, v_c, m', n') + c \quad (4)$$

at the image optical axis center $(u_c, v_c)$.

Figure 5D:
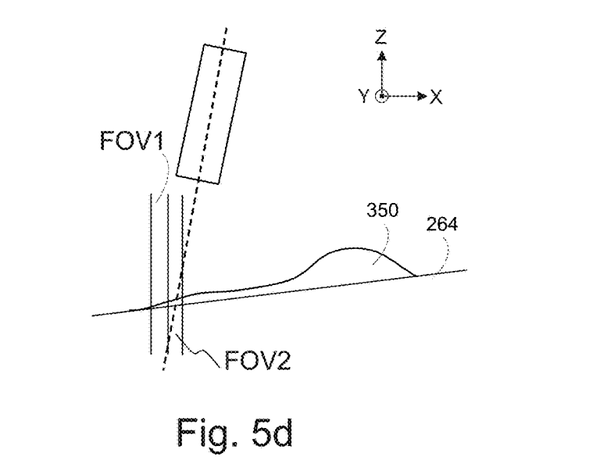
FIG. 5d shows, by way of example, adjacent field of view and a target field of view of a non-uniform sample as a side view.

FIG. 5d shows, by way of example, adjacent field of view and a target field of view of a non-uniform sample 350 as a side view. A first image stack of a first field of view FOV1 is received. A first spatial distribution of focus depth in which different areas in the first field of view are in focus is determined. A first local sample thickness c and a first sample tilt in the first field of view is determined based on the first spatial distribution of focus depths. The local sample thickness is determined at the image optical axis center. Sample tilt is described by the coefficients $a_s$ and $b_s$. Thus, focus setting for the second field of view FOV2 may be estimated as described above.

According to an embodiment, the coefficients $a_s$, $b_s$, and c may be determined at more than one locations around the target location (m',n'). Multiple estimates obtained this way may be combined to obtain a better estimate. For example, the estimates may be averaged.

Alternatively the estimate may be a weighted average. The weight may be a confidence metric estimating reliability of the focus depth estimation. The weight may be dependent on the distance between the first field of view and the target field of view. Larger weight may be assigned when the estimate is based on the field of view which is next to the target field of view. Smaller weight may be assigned when the estimate is based on the field of view which is further from the target field of view. Alternatively, the weight may be dependent on the planarity of the measurements z'(u, v, m, n), i.e. the residual in the measurement model (3). Residual indicates how well the model fits to reality. Low planarity (high residual) suggests that the sample thickness is locally very non-uniform, and the focus depth at the neighboring fields of view cannot be reliably predicted from the current field of view.

Figure 6A:
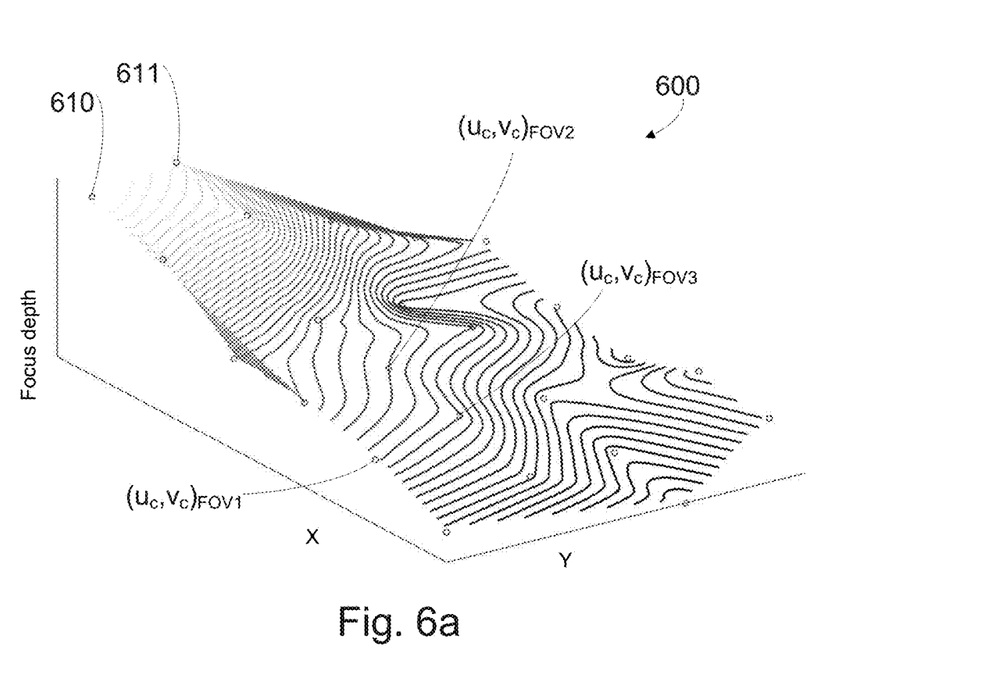
FIGS. 6a and 6b show, by way of example, focus depth of a non-uniform sample in a three-dimensional view.
Figure 6B:
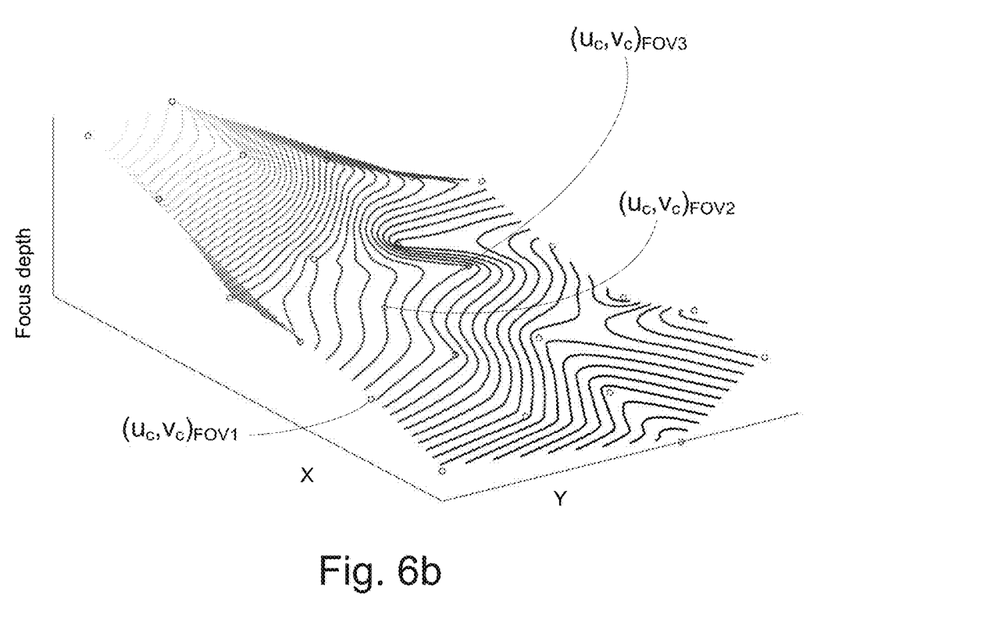

FIGS. 6a and 6b show, by way of example, focus depth 600 of a non-uniform sample in a three-dimensional view. The focus depth is the optical configuration parameter that is controlled to obtain the focus of the imaging system. Small circles 610, 611 indicate the central points of the fields of view. Areas at the borders of the fields of view may overlap.

$(u_c, v_c)_{FOV1}$ is the distortion center of a first field of view FOV1. $(u_c, v_c)_{FOV3}$ is the distortion center of a third field of view FOV3. The first field of view FOV1 and the third field of view FOV3 are the adjacent fields of view. $(u_c, v_c)_{FOV2}$ is the distortion center of a second field of view FOV2. The second field of view FOV2 is the target field of view. The first field of view and the third field of view are adjacent fields of view for the second field of view.

A first image stack is received of a first field of view FOV1. A first spatial distribution of focus depth in which different areas in the first field of view are in focus is determined from the first image stack. A first local sample thickness and a first sample tilt is determined at the first field of view based on the first spatial distribution of focus depths. A third image stack of the third field of view FOV3 is received. It is noted that other image stacks may be captured from other fields of view between capturing the first image stack and the third image stack.

The third image stack comprises images captured with different focus at the third field of view. A third spatial distribution of focus depths in which different areas in the third field of view are in focus is determined from the third image stack. A third local sample thickness and a third sample tilt is determined based on the third spatial distribution of focus depths. A focus setting for capturing a second image stack of a second field of view is estimated using the equation (4) based on the first local sample thickness, the first sample tilt, the third local sample thickness and the third sample tilt. These two estimates based on the first image stack and the third image stack may be e.g. averaged.

A first focus setting based on the first local sample thickness and the first sample tilt may be estimated. A third focus setting based on the third local sample thickness and the third sample tilt may be estimated. The first focus setting and the third focus setting may be averaged to obtain the focus setting for capturing the second image stack from the second field of view.

Alternatively the estimate may be a weighted average. Let us compare the spatial distributions of focus depths in FIGS. 6a and 6b. Central point of the third field of view in FIG. 6a is located on a more uniform area of the sample than in FIG. 6b. Thus, the estimate based on the third field of view in FIG. 6a may be assigned a higher weight than the estimate based on the third field of view in FIG. 6b. The weights may be calculated, for example, using the residual in the measurement model (3).

Residual $r_1$ for FOV1 and residual $r_3$ for FOV3 may be calculated as follows:

$$r_1 = \sum_{i=1}^{N} ((z'(u_{i,1}, v_{i,1}, m_1, n_1) - $$
$$(a_{s,1}s(u_{i,1}, v_{i,1}, m_1, n_1) + b_{s,1}t(u_{i,1}, v_{i,1}, m_1, n_1) + c_1)))^2$$
$$r_3 = \sum_{i=1}^{N} ((z'(u_{i,3}, v_{i,3}, m_3, n_3) - $$
$$(a_{s,3}s(u_{i,3}, v_{i,3}, m_3, n_3) + b_{s,3}t(u_{i,3}, v_{i,3}, m_3, n_3) + c_3)))^2$$

wherein N is the number of measurements. The higher is the residual, the less reliable is a planar model for estimating the spatial distribution of focus depths in the FOV in question. Weights for the first focus setting (based on FOV1) and the third focus setting (based on FOV3) may be calculated as follows:

$$w_1 = \frac{\frac{1}{r_1}}{\frac{1}{r_1} + \frac{1}{r_3}}, w_3 = \frac{\frac{1}{r_3}}{\frac{1}{r_1} + \frac{1}{r_3}}.$$

Figure 7A:
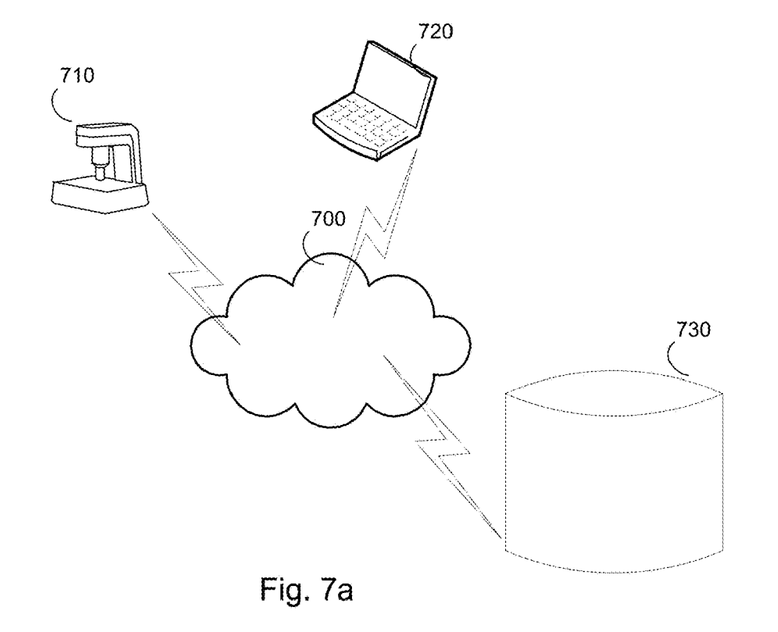
FIG. 7a shows, by way of example, a system and devices for scanning microscope slides and for performing focusing.

FIG. 7a shows, by way of example, a system and devices for scanning microscope slides and for performing focusing. The different devices may be connected to each other via a communication connection 700, e.g. vie Internet, a mobile communication network, Wireless Local Area Network (WLAN), Bluetooth®, or other contemporary and future networks. Different networks may be connected to each other by means of a communication interface. A scanning apparatus 710 may be used to scan microscope slides. The scanning apparatus may be a portable microscope scanner. The microscope scanner may have a light weight, e.g. 3-4 kg, such as 3.5 kg. The captured image data may be stored in a database 730 and/or in a memory of the scanning apparatus or of a user device 720. The database may be a server or a group of servers. The servers may form a server system, e.g. a cloud. The scanning apparatus 710 may be connected to the user device 720. The user device may be e.g. a personal computer, a laptop or a smartphone. The scanning apparatus may be controlled by another device, e.g. the user device. A user of the user device 720 may use a user interface of the user device for entering commands, parameters, etc. and the user may be provided with information from the scanning apparatus 710 via the user interface. The estimation of focusing parameters may be performed in the scanning apparatus. Alternatively or in addition, the estimation may be performed e.g. in a server or in the user device.

Figure 7B:
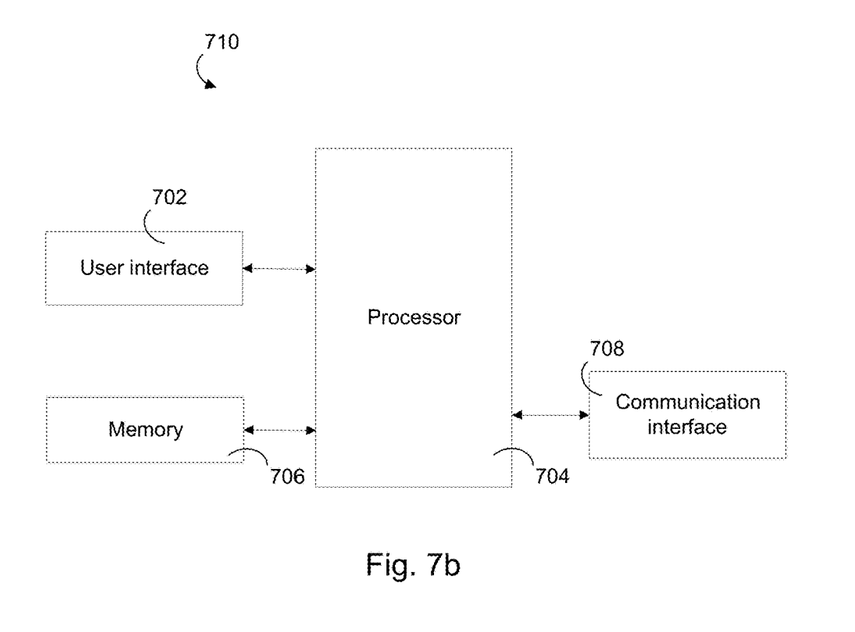
FIG. 7b shows, by way of example, a block diagram of an apparatus for performing focusing.

FIG. 7b shows, by way of an example, a block diagram of an apparatus for scanning microscope slides and for performing focusing. The apparatus may be e.g. the scanning apparatus 710. The apparatus may comprise means such as circuitry and electronics for handling, receiving and transmitting data. The apparatus may receive user input such as commands, parameters etc. via a communication interface 708. The apparatus may comprise a memory 706 for storing data and computer program code which can be executed by a processor 704 to carry out various embodiment of the method as disclosed herein. The elements of the method may be implemented as a software component residing in the apparatus or distributed across several apparatuses. The apparatus may comprise a user interface 702. The user interface may be displayed on the user device 720. When the estimation of focusing parameters are performed in a server or in the user device, the image stack of the first field of view may be sent from the apparatus to the server or the user device. Then, the apparatus may receive estimated focus setting for capturing the image stack of the next field of view from the server or the user device. The apparatus may use the estimated focus setting for capturing the image stack of the next field of view.

Image stacks of the fields of view may be acquired such that the camera sensor captures a first plurality of images from a first position at a first rate while focus setting is changed in continuous motion and a flash unit flashes at a second rate. The first rate and the second rate are synchronized. The captured first plurality of images comprises images captured with different focus setting from the first position.

The focus may be changed using the liquid lens. The focal length of the liquid lens may be controlled and adjusted by applying a driving current. The driving current, image capture and the flash unit may be synchronized such that a plurality of images from a desired position may be captured, wherein the captured plurality of images comprises images captured with different focus setting from the desired position.

The apparatus, e.g. a digital microscope scanner, may comprise means for receiving a first image stack of a first field of view, the first image stack comprising images captured with different focus from the first field of view. The apparatus may comprise means for determining, from the first image stack, a first spatial distribution of focus depths in which different areas in the first field of view are in focus. The apparatus may comprise means for determining a first local sample thickness and a first sample tilt in the first field of view based on the first spatial distribution of focus depths. The apparatus may comprise means for estimating, based on the first local sample thickness and the first sample tilt, a focus setting for capturing a second image stack from a second field of view.

The apparatus may comprise means for capturing the second image stack from the second field of view using the estimated focus setting.

The determining the first local sample thickness and the first sample tilt may comprise eliminating effects caused by apparatus-specific measures from the spatial distribution of focus depths. The apparatus-specific measures may comprise one or more of a pre-defined field curvature and a pre-defined optical axis tilt.

The determining the first local sample thickness and the first sample tilt may comprise subtracting terms accounting for pre-defined field curvature and/or pre-defined optical axis tilt from a focus depth model and determining coefficients defining the first local sample thickness and the first sample tilt by applying a linear estimation approach to the focus depth model.

The focus depth model may comprise coordinate functions transforming an image pixel coordinate and a stage control coordinate pair to stage coordinates. The apparatus may comprise means for capturing, at a location according to the stage control coordinates, an image of a known target located at a location according to the stage coordinates on a calibration slide. The apparatus may comprise means for measuring an image pixel location according to image pixel coordinates from the image of the target. The apparatus may comprise means for forming a pair of equations modeling a transformation from the image pixel coordinate and the stage control coordinate pair to the stage coordinates. The apparatus may comprise means for repeating the capturing, measuring and forming at least five times. The apparatus may comprise means for determining coefficients of the transformation by applying a linear estimation approach to the pairs of equations.

The apparatus may comprise means for receiving a third image stack of a third field of view, the third image stack comprising images captured with different focus from the third field of view and wherein the first field of view and the third field of view are adjacent fields of view for the second field of view. The apparatus may comprise means for determining, from the third image stack, a third spatial distribution of focus depths in which different areas in the third field of view are in focus. The apparatus may comprise means for determining a third local sample thickness and a third sample tilt based on the third spatial distribution of focus depths. The apparatus may comprise means for estimating, based on the first local sample thickness, the first sample tilt, the third local sample thickness and the third sample tilt, a focus setting for capturing a second image stack from a second field of view.

The apparatus may comprise means for estimating a first focus setting based on the first local sample thickness and the first sample tilt. The apparatus may comprise means for estimating a third focus setting based on the third local sample thickness and the third sample tilt. The apparatus may comprise means for averaging the first focus setting and the third focus setting to obtain the focus setting for capturing the second image stack from the second field of view.

The apparatus may comprise means for assigning a weight for the first focus setting based on the distance between the first field of view and the second field of view.

It is obvious that the present invention is not limited solely to the above-presented embodiments, but it can be modified within the scope of the appended claims.

The invention claimed is:

1. A method for focusing, comprising:
receiving a first image stack of a first field of view, the first image stack comprising images captured with different focus from the first field of view;
determining, from the first image stack, a first spatial distribution of focus depths in which different areas in the first field of view are in focus;
determining a first local sample thickness and a first sample tilt in the first field of view based on the first spatial distribution of focus depths;
receiving a third image stack of a third field of view, the third image stack comprising images captured with different focus from the third field of view and wherein the first field of view and the third field of view are adjacent fields of view for a second field of view;
determining, from the third image stack, a third spatial distribution of focus depths in which different areas in the third field of view are in focus;
determining a third local sample thickness and a third sample tilt based on the third spatial distribution of focus depths; and
estimating, based on the first local sample thickness, the first sample tilt, the third local sample thickness and the third sample tilt, a focus setting for capturing a second image stack from the second field of view.

2. The method according to claim 1, wherein the determining the first local sample thickness and the first sample tilt comprises eliminating effects caused by apparatus-specific measures from the spatial distribution of focus depths.

3. The method according to claim 2, wherein the apparatus-specific measures comprise one or more of a pre-defined field curvature and a pre-defined optical axis tilt.

4. The method according to claim 1, further comprising
estimating a first focus setting based on the first local sample thickness and the first sample tilt;
estimating a third focus setting based on the third local sample thickness and the third sample tilt;
averaging the first focus setting and the third focus setting to obtain the focus setting for capturing the second image stack from the second field of view.

5. The method according to claim 4, further comprising
assigning a weight for the first focus setting based on the distance between the first field of view and the second field of view.

6. The method according to claim 4, further comprising
assigning a weight for the first focus setting based on a planarity of the first spatial distribution of focus depths.

7. A method for focusing, comprising:
receiving a first image stack of a first field of view, the first image stack comprising images captured with different focus from the first field of view;
determining, from the first image stack, a first spatial distribution of focus depths in which different areas in the first field of view are in focus;
determining a first local sample thickness and a first sample tilt in the first field of view based on the first spatial distribution of focus depths,
wherein determining the first local sample thickness and the first sample tilt comprises:
subtracting terms accounting for pre-defined field curvature and/or pre-defined optical axis tilt from a focus depth model;
determining coefficients defining the first local sample thickness and the first sample tilt by applying a linear estimation approach to the focus depth model; and
wherein the focus depth model comprises coordinate functions transforming an image pixel coordinate and a stage control coordinate pair to stage coordinates, and the method further comprises:
capturing, at a location according to the stage control coordinates, an image of a known target located at a location according to the stage coordinates on a calibration slide;
measuring an image pixel location according to image pixel coordinates from the image of the target;
forming a pair of equations modeling a transformation from the image pixel coordinate and the stage control coordinate pair to the stage coordinates;
repeating the capturing, measuring and forming at least five times, wherein the known target is located at different location each time; and
determining coefficients of the transformation by applying a linear estimation approach to the pairs of equations; and the method further comprises
estimating, based on the first local sample thickness and the first sample tilt, a focus setting for capturing a second image stack from a second field of view.

8. An apparatus comprising at least one processor; at least one memory including computer program code; the at least one memory and the computer program code configured to, with the at least one processor, cause the apparatus at least to perform:

receiving a first image stack of a first field of view, the first image stack comprising images captured with different focus from the first field of view;
determining, from the first image stack, a first spatial distribution of focus depths in which different areas in the first field of view are in focus;
determining a first local sample thickness and a first sample tilt in the first field of view based on the first spatial distribution of focus depths;
receiving a third image stack of a third field of view, the third image stack comprising images captured with different focus from the third field of view and wherein the first field of view and the third field of view are adjacent fields of view for a second field of view;
determining, from the third image stack, a third spatial distribution of focus depths in which different areas in the third field of view are in focus;
determining a third local sample thickness and a third sample tilt based on the third spatial distribution of focus depths; and
estimating, based on the first local sample thickness, the first sample tilt, the third local sample thickness and the third sample tilt, a focus setting for capturing a second image stack from the second field of view.

9. The apparatus according to claim 8, further caused to perform:
estimating a first focus setting based on the first local sample thickness and the first sample tilt;
estimating a third focus setting based on the third local sample thickness and the third sample tilt; and
averaging the first focus setting and the third focus setting to obtain the focus setting for capturing the second image stack from the second field of view.

10. The apparatus according to claim 9, further caused to perform assigning a weight for the first focus setting based on the distance between the first field of view and the second field of view.

11. The apparatus according to claim 9, further caused to perform:
assigning a weight for the first focus setting based on a planarity of the first spatial distribution of focus depths.

12. The apparatus according to claim 8, wherein the apparatus is a digital microscope scanner.

13. The apparatus according to claim 8, wherein the determining the first local sample thickness and the first sample tilt comprises eliminating effects caused by apparatus-specific measures from the spatial distribution of focus depths.

14. The apparatus according to claim 13, wherein the apparatus-specific measures comprise one or more of a pre-defined field curvature and a pre-defined optical axis tilt.

15. An apparatus comprising:
at least one processor;
at least one memory including computer program code, the at least one memory and the computer program code configured to, with the at least one processor, cause the apparatus at least to perform:
receiving a first image stack of a first field of view, the first image stack comprising images captured with different focus from the first field of view;
determining, from the first image stack, a first spatial distribution of focus depths in which different areas in the first field of view are in focus;
determining a first local sample thickness and a first sample tilt in the first field of view based on the first spatial distribution of focus depths, wherein determining the first local sample thickness and the first sample tilt comprises:
    subtracting terms accounting for pre-defined field curvature and/or pre-defined optical axis tilt from a focus depth model; and
    determining coefficients defining the first local sample thickness and the first sample tilt by applying a linear estimation approach to the focus depth model;
    wherein the focus depth model comprises coordinate functions transforming an image pixel coordinate and a stage control coordinate pair to stage coordinates, and the apparatus is further caused to perform:
    capturing, at a location according to the stage control coordinates, an image of a known target located at a location according to the stage coordinates on a calibration slide;
    measuring an image pixel location according to image pixel coordinates from the image of the target;
    forming a pair of equations modeling a transformation from the image pixel coordinate and the stage control coordinate pair to the stage coordinates;
    repeating the capturing, measuring and forming at least five times, wherein the known target is located at different location each time; and
    determining coefficients of the transformation by applying a linear estimation approach to the pairs of equations; and the apparatus is further caused to perform
    estimating, based on the first local sample thickness and the first sample tilt, a focus setting for capturing a second image stack from a second field of view.

16. The apparatus according to claim 15, wherein the apparatus is a digital microscope scanner.

17. A computer program product embodied on a non-transitory computer readable medium, comprising computer program code configured to, when executed on at least one processor, cause an apparatus or a system to:
    receive a first image stack of a first field of view, the first image stack comprising images captured with different focus from the first field of view;
    determine, from the first image stack, a first spatial distribution of focus depths in which different areas in the first field of view are in focus;
    determine a first local sample thickness and a first sample tilt in the first field of view based on the first spatial distribution of focus depths;
    receive a third image stack of a third field of view, the third image stack comprising images captured with different focus from the third field of view and wherein the first field of view and the third field of view are adjacent fields of view for a second field of view;
    determine, from the third image stack, a third spatial distribution of focus depths in which different areas in the third field of view are in focus;
    determine a third local sample thickness and a third sample tilt based on the third spatial distribution of focus depths; and
    estimate, based on the first local sample thickness, the first sample tilt, the third local sample thickness and the third sample tilt, a focus setting for capturing a second image stack from the second field of view.

18. The computer program product according to claim 17, wherein the determining the first local sample thickness and the first sample tilt comprises
    eliminating effects caused by apparatus-specific measures from the spatial distribution of focus depths.

19. The computer program product according to claim 18, wherein the apparatus-specific measures comprise one or more of a pre-defined field curvature and a pre-defined optical axis tilt.

20. A computer program product embodied on a non-transitory computer readable medium, comprising computer program code configured to, when executed on at least one processor, cause an apparatus or a system to:
    receive a first image stack of a first field of view, the first image stack comprising images captured with different focus from the first field of view;
    determine, from the first image stack, a first spatial distribution of focus depths in which different areas in the first field of view are in focus;
    determine a first local sample thickness and a first sample tilt in the first field of view based on the first spatial distribution of focus depths,
wherein determining the first local sample thickness and the first sample tilt comprises:
    subtracting terms accounting for pre-defined field curvature and/or pre-defined optical axis tilt from a focus depth model;
    determining coefficients defining the first local sample thickness and the first sample tilt by applying a linear estimation approach to the focus depth model, wherein the focus depth model comprises coordinate functions transforming an image pixel coordinate and a stage control coordinate pair to stage coordinates, and wherein the computer program code is further configured to cause the apparatus or the system to:
    capture, at a location according to the stage control coordinates, an image of a known target located at a location according to the stage coordinates on a calibration slide;
    measure an image pixel location according to image pixel coordinates from the image of the target;
    form a pair of equations modeling a transformation from the image pixel coordinate and the stage control coordinate pair to the stage coordinates;
    repeat the capturing, measuring and forming at least five times, wherein the known target is located at different location each time; and
    determine coefficients of the transformation by applying a linear estimation approach to the pairs of equations; and the computer program code is further configured to cause the apparatus or the system to
    estimate, based on the first local sample thickness and the first sample tilt, a focus setting for capturing a second image stack from a second field of view.

\* \* \* \* \*